US012128478B2

(12) United States Patent
Roesgen et al.

(10) Patent No.: US 12,128,478 B2
(45) Date of Patent: Oct. 29, 2024

(54) METHOD AND APPARATUS FOR CALIBRATING OPTICAL ELEMENTS

(71) Applicant: Nikon SLM Solutions AG, Luebeck (DE)

(72) Inventors: Lukas Roesgen, Luebeck (DE); Daniel Brueck, Luebeck (DE); Andreas Wiesner, Luebeck (DE)

(73) Assignee: NIKON SLM Solutions AG, Lübeck (DE)

( * ) Notice: Subject to any disclaimer, the term of this patent is extended or adjusted under 35 U.S.C. 154(b) by 432 days.

(21) Appl. No.: 17/606,114

(22) PCT Filed: Mar. 31, 2020

(86) PCT No.: PCT/EP2020/059056
§ 371 (c)(1),
(2) Date: Oct. 25, 2021

(87) PCT Pub. No.: WO2020/233877
PCT Pub. Date: Nov. 26, 2020

(65) Prior Publication Data
US 2022/0193772 A1 Jun. 23, 2022

(30) Foreign Application Priority Data
May 17, 2019 (DE) ................ 10 2019 113 104.9

(51) Int. Cl.
*B22F 10/31* (2021.01)
*B22F 12/17* (2021.01)
(Continued)

(52) U.S. Cl.
CPC .............. *B22F 10/31* (2021.01); *B22F 12/17* (2021.01); *B22F 12/30* (2021.01); *B22F 12/41* (2021.01);
(Continued)

(58) Field of Classification Search
CPC .......... B22F 10/31; B22F 12/17; B22F 12/30; B22F 12/41; B22F 12/90; B22F 2203/11;
(Continued)

(56) References Cited

U.S. PATENT DOCUMENTS

2003/0002055 A1 1/2003 Kilthau et al.
2016/0082668 A1 3/2016 Perret et al.
(Continued)

FOREIGN PATENT DOCUMENTS

CN 102105291 6/2011
CN 105358310 2/2016
(Continued)

OTHER PUBLICATIONS

Japanese Patent Office, Japanese Examination Report for JP Patent Application No. 2021-568558, Dec. 26, 2022.
(Continued)

*Primary Examiner* — Michael J Brown
(74) *Attorney, Agent, or Firm* — Williams Mullen; Thomas F. Bergert

(57) ABSTRACT

We describe a calibration method for calibrating one or more optical elements of an additive layer manufacturing apparatus useable for producing a three-dimensional workpiece, the method comprising: projecting, using the one or more optical elements, an optical pattern onto a material in order to prepare, from said material, solidified material layers using an additive layer manufacturing technique to form a test sample; determining a geometry of the test sample; comparing the determined geometry with a nominal geometry to generate calibration data; and calibrating the one or more optical elements using said calibration data.

21 Claims, 7 Drawing Sheets

(51) Int. Cl.
  *B22F 12/30* (2021.01)
  *B22F 12/41* (2021.01)
  *B22F 12/90* (2021.01)
  *B33Y 30/00* (2015.01)
  *B33Y 50/02* (2015.01)
  B29C 64/386 (2017.01)
  B33Y 50/00 (2015.01)

(52) U.S. Cl.
  CPC .............. *B22F 12/90* (2021.01); *B33Y 30/00* (2014.12); *B33Y 50/02* (2014.12); *B22F 2203/11* (2013.01)

(58) Field of Classification Search
  CPC ..... B22F 2999/00; B33Y 30/00; B33Y 50/02; B33Y 50/00; B33Y 40/00; Y02P 10/25; B29C 64/386
  USPC ........................................................ 700/118
  See application file for complete search history.

(56) References Cited

U.S. PATENT DOCUMENTS

| | | |
|---|---|---|
| 2016/0098825 A1 | 4/2016 | Dave et al. |
| 2016/0236279 A1 | 8/2016 | Ashton et al. |
| 2017/0090462 A1 | 3/2017 | Dave et al. |
| 2017/0203517 A1 | 7/2017 | Crear et al. |
| 2018/0001568 A1 | 1/2018 | Ribes et al. |
| 2018/0186082 A1* | 7/2018 | Randhawa .............. B22F 12/44 |
| 2018/0304540 A1 | 10/2018 | Tobia et al. |
| 2018/0326485 A1 | 11/2018 | Brown |

FOREIGN PATENT DOCUMENTS

| | | |
|---|---|---|
| CN | 106984897 | 7/2017 |
| CN | 107206697 | 9/2017 |
| CN | 107460477 | 12/2017 |
| CN | 108778571 | 11/2018 |
| CN | 108994293 | 12/2018 |
| DE | 102013208651 | 11/2014 |
| DE | 102015102111 | 8/2016 |
| EP | 2186625 | 5/2010 |
| EP | 3202524 | 8/2017 |
| EP | 3412383 | 12/2018 |
| FR | 3046108 | 6/2017 |
| JP | 2005336547 | 12/2005 |
| JP | 2019510658 | 4/2019 |
| WO | 2017158327 | 9/2017 |
| WO | 20170190863 | 11/2017 |
| WO | 2019161886 | 8/2019 |

OTHER PUBLICATIONS

China National Intellectual Property Administration, Examination Report for CN Patent Application No. 202080037285.X, Feb. 1, 2023.

European Patent Office, International Search Report and Written Opinion for International Application No. PCT/EP2020/059056, Jul. 6, 2020.

Search Report for German Application No. 10 2019 113 104.9, German Patent Office, Jan. 27, 2020.

* cited by examiner

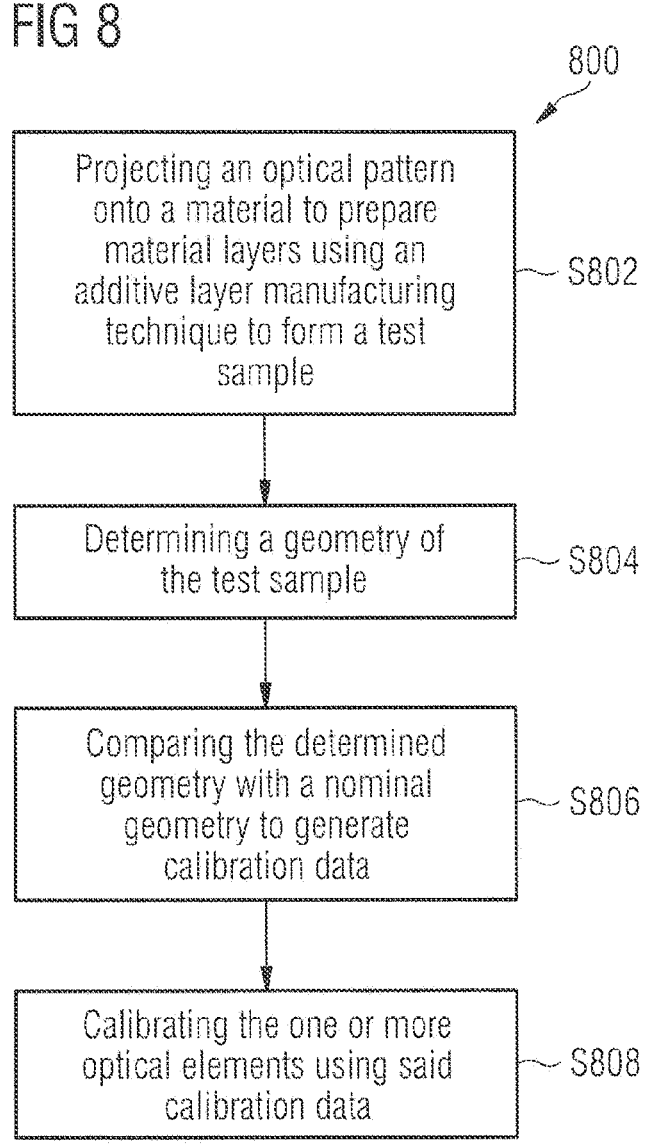

METHOD AND APPARATUS FOR CALIBRATING OPTICAL ELEMENTS

This application is the U.S. national phase of international application PCT/EP2020/059056, filed on Mar. 31, 2020, which claims the benefit of German application DE 10 2019 113 104.9 filed on May 17, 2019; all of which are hereby incorporated herein in their entirety by reference.

The present invention generally relates to a calibration method and an apparatus for producing a three-dimensional workpiece. The calibration method and the apparatus may hereby be used in particular for image field correction in a powder bed.

In additive layering methods, workpieces are produced layer-by-layer by generating a sequence of solidified and interconnected workpiece layers. These processes may be distinguished by the type of raw material and/or the way of solidifying said raw material in order to produce the workpiece.

For example, powder bed fusion is a kind of additive layering process by which pulverulent, in particular metallic and/or ceramic raw materials, can be processed to three-dimensional workpieces of complex shapes. To that end, a raw material powder layer is applied onto a carrier and subjected to, for example, laser radiation in a site selective manner in dependence on the desired geometry of the workpiece that is to be produced. The laser radiation penetrating into the powder layer causes heating and consequently melting or sintering of the raw material powder particles. Further raw material powder layers are then applied successively to the layer on the carrier that has already been subjected to laser treatment, until the workpiece has the desired shape and size. Selective laser melting or laser sintering can be used in particular for the production of prototypes, tools, replacement parts or medical prostheses, such as, for example, dental or orthopaedic prostheses, on the basis of CAD data.

Currently, one or more optical elements (which may be comprised in or integral to one or more optical systems) may be calibrated by projecting an optical (dot) pattern onto a laser foil or burn-off foil which is glued to a carrier plate, and subsequently evaluating the foil with a coordinate-measuring machine. This can be done individually for each optical element or simultaneously for all optical elements. As an alternative to the burn-off foil, an anodized aluminum plate is also frequently used. This method has several disadvantages, as will be outlined in the following.

FIG. 1 shows an exposure method for exposing of a point by a first optical element, O1, and a second optical element, O2, as shown in the top view of the schematic illustration depicted in FIG. 1 (a). In this example, the first optical element, O1, is configured to expose points in the area 102. The second optical element, O2, is configured to expose points in the area 104. Both of the second and first optical elements are configured to expose points in the overlap area 106.

FIG. 1 (b) depicts a schematic illustration of a front view of an exposure method as outlined above in which a scan field correction is performed when scanning a scan field plane 108 with the first and second optical elements.

FIG. 1 (c) depicts a schematic illustration of a side view of an exposure method as outlined above in which a scan field correction is performed when scanning a scan field plane with the first and second optical elements.

FIG. 1 (d) depicts a schematic illustration of a front view of an exposure method as outlined above in which a build job is shown.

FIG. 1 (e) depicts a schematic illustration of a side view of an exposure method as outlined above in which a build job is shown.

The inventors have realized the following:

The plane of the carrier plate and the exposure plane do not necessarily coincide.

This may result in the optical elements/systems being offset from each other. This misalignment may need to be corrected afterwards.

Furthermore, the apparatus may not be under process conditions (in particular in relation to the temperature) during current image field correction.

Further still, the foil may react differently than the powder used to produce the three-dimensional workpiece. Other parameters and modes (for example speed, delay and sky-writing) for producing the three-dimensional workpiece may be used.

The carrier/substrate plate may expand while it is in the apparatus and may shrink again when evaluated at room temperature. Consequently, shrinkage is partially compensated, whereby the shrinkage is not caused by the optical element(s) and may thus falsify the result.

It is therefore an object of the present invention to improve calibrating optical elements (which may comprise lasers and/or other beam sources and/or other optical components used for example for steering a beam, such as a laser beam) of an apparatus for producing a three-dimensional workpiece.

The invention is set out in the independent claims. Preferred embodiments of the invention are outlined in the dependent claims.

We describe a calibration method for calibrating one or more optical elements of an additive layer manufacturing apparatus useable for producing a three-dimensional workpiece, the method comprising: projecting, using the one or more optical elements, an optical pattern onto a material in order to prepare, from said material, solidified material layers using an additive layer manufacturing technique to form a test sample; determining a geometry of the test sample; comparing the determined geometry with a nominal geometry to generate calibration data; and calibrating the one or more optical elements using said calibration data; wherein one or more of the material layers of the test sample are prepared only when a first temperature variation rate of a first temperature of a said optical element and/or a second temperature variation rate of a second temperature of an enclosure in which the one or more material layers are prepared and/or a third temperature variation rate of a third temperature of a substrate on which the test sample is formed is below a threshold rate. Furthermore, we describe an apparatus for producing a three-dimensional workpiece, the apparatus comprising: a substrate adapted to receive material useable for producing the three-dimensional workpiece; one or more optical elements adapted to project an optical pattern onto the material in order to prepare, from said material, solidified material layers using an additive layer manufacturing technique to form a test sample; and a calibration unit adapted to: determine a geometry of the test sample; compare the determined geometry with a nominal geometry to generate calibration data; and calibrate the one or more optical elements using said calibration data; and wherein the apparatus is configured to prepare one or more of the material layers of the test sample only when a first temperature variation rate of a first temperature of a said optical element and/or a second temperature variation rate of a second temperature of an enclosure in which the one or more material layers are prepared and/or a third temperature variation rate of a third temperature of the substrate is below a threshold rate.

The one or more material layers of the test sample may hereby relate, for example, to a lowermost layer (or layers) and/or an uppermost layer (or layers) and/or to a random selection of one or more layers of the test sample. In particular, any one or more of the material layers of the test sample may be prepared, on already solidified one or more material layers (the preparation of which may have led to temperature variations of the aforementioned first and/or second and/or third temperature), only when the above-mentioned condition is fulfilled.

In some examples, the entire test sample is prepared from material layers only when the above-mentioned condition in relation to the temperature variation rate(s) is fulfilled. Alternatively, only one or more (but not necessarily all) layers of the test sample are prepared only when the above-mentioned condition in relation to the temperature variation rate(s) is fulfilled. It may be particularly advantageous to prepare a lower part of the test sample based on material layers for which the condition is not necessarily fulfilled (but may be fulfilled), and prepare an upper part of the test sample based on material layers for which the condition is fulfilled. This may allow for a faster preparation of the lower part (compared to the upper part) of the test sample during which temperature variations can be ignored (in some examples at least to some extent), while the upper part is prepared while the temperature variation rate conditions are fulfilled for improved precision/quality when preparing the upper part of the test sample.

Throughout the present disclosure, any references to the enclosure may relate, for example, to a process chamber of the additive layer manufacturing apparatus and/or a wall (distinct from the process chamber) of the additive layer manufacturing apparatus and/or an area around the material layer (but within the material layer) which may be solidified and/or a volume above the material layer which may be solidified.

We describe a calibration method for calibrating one or more optical elements of an additive layer manufacturing apparatus useable for producing a three-dimensional workpiece, the method comprising: projecting, using the one or more optical elements, an optical pattern onto a material in order to prepare, from said material, solidified material layers using an additive layer manufacturing technique to form a test sample; determining a geometry of the test sample; comparing the determined geometry with a nominal geometry to generate calibration data, wherein the nominal geometry is based on data used for defining the optical pattern; and calibrating the one or more optical elements using said calibration data.

The nominal geometry which is based on data defining the optical pattern may relate to (predefined) data which may be used to subsequently project the optical pattern onto the material in order to prepare, from the material, the solidified material layers using the additive layer manufacturing technique to form the test sample. An initial step of the calibration method, prior to the projecting step, may therefore relate to obtaining and/or generating and/or defining data for defining a nominal geometry for example of a test sample. We therefore describe a calibration method for calibrating one or more optical elements of an additive layer manufacturing apparatus useable for producing a three-dimensional workpiece, the method comprising: obtaining and/or generating and/or defining data for defining a nominal geometry of a test sample; projecting, using the one or more optical elements, an optical pattern, based on the defined data, onto a material in order to prepare, from said material, solidified material layers using an additive layer manufacturing technique to form the test sample; determining a geometry of the test sample; comparing the determined geometry with the nominal geometry to generate calibration data; and calibrating the one or more optical elements using said calibration data.

The nominal geometry may relate to a virtual, a light-projected or a real part or object/reference structure, or any combination thereof.

Calibrating the one or more optical elements of the additive layer manufacturing apparatus based on a test sample which is prepared from a material using an additive layer manufacturing technique may allow for eliminating the disadvantages outlined above in relation to the foil.

In particular, the one or more optical elements may be calibrated based on the test sample being prepared on the same exposure plane as the three-dimensional workpiece which is subsequently produced once the one or more optical elements are calibrated.

Furthermore, calibrating the one or more optical elements using the test sample may be performed under process conditions, and in particular at a temperature (or within a temperature range) at which the three-dimensional workpiece is subsequently produced once the one or more optical elements are calibrated.

Example implementations of the calibration method as described herein may further allow using the same material for producing the test sample as the material which is subsequently used for producing the three-dimensional workpiece. It may therefore be ensured that the material for producing the test sample for calibration purposes and for the three-dimensional workpiece produced once the one or more optical elements are calibrated, respectively, react in the same manner in response to a beam impinging on the material so as to produce solidified material layers.

The one or more optical elements may, in some examples, comprise one or more of: one or more beam sources, in particular lasers, one or more optical beam steering components, one or more optical scanners, and a combination of any of the aforementioned.

The pattern may, in some examples, comprise one or more individual elements, whereby the one or more individual elements may extend in a plane parallel to the material layers (generally referred to as the x-y plane) by a predefined length and width.

In some examples of the calibration method, the geometry and the nominal geometry comprise coordinates and nominal coordinates, respectively, of a location of the test sample. The coordinates and nominal coordinates may hereby, in some examples, refer to a plurality of locations of the test sample when the test sample comprises, for example, a pattern having multiple individual elements, such as, but not limited to a dot or dot-like pattern. By providing a pattern having multiple individual elements, precision of the calibration method may be improved based on multiple locations being usable as reference locations (for example reference points).

In some examples of the calibration method, said determining comprises determining geometrical data relating to a said material layer of the test sample prepared last (i.e. an uppermost layer) using the additive layer manufacturing technique. This may be particularly advantageous since the one or more optical elements may heat up during the process of forming the test sample, whereby the temperature of the one or more optical elements may be stable upon the last material layer of the test sample having been prepared. As a result, a potential position-related shift of a beam (for example laser beam) in particular in the plane of the material layer (i.e. the x-y plane) due to temperature variations of a temperature of the one more optical elements may be minimized or even be avoided.

In some examples of the calibration method, said preparing using the additive layer manufacturing technique comprises supplying different layers of said material on a same height level for preparing the test sample using the additive layer manufacturing technique. In some examples, the supplying of the different layers of said material on the same height level comprises lowering the test sample prior to supplying consecutive ones of the different layers. Supplying different layers of the material on a same height level may comprise the material supply means (which may comprise a coater and/or a lip and/or a blade) operating on one plane during the additive layer manufacturing process. The above may be particularly advantageous as the preparation of the test sample may be performed on the same level (i.e. height) as in the process for producing the three-dimensional workpiece. Furthermore, the calibration method may, in some examples, be optimized for one particular level/height.

In some examples, the material supply means may operate during the calibration method on the same height level/plane as during the process for manufacturing a three-dimensional object after the calibration has been completed.

In some examples of the calibration method, the forming of the test sample is performed over a period longer than a threshold period. As outlined above, the one or more optical elements may heat up during the preparation of the test sample. After a certain time, the temperature of the one or more optical elements may be constant or nearly constant. As a result, a positional shift of a beam in the x-y plane due to temperature variations of the temperature of the one more optical elements may be minimized or even avoided. Precision of calibrating the one or more optical elements may hereby be further improved.

In some examples of the calibration method, a said material layer (in particular the uppermost layer) of the test sample is prepared only when a first temperature variation rate of a first temperature of a said optical element and/or a second temperature variation rate of a second temperature of an enclosure in which the material layer is prepared is below a first threshold rate. At constant temperature conditions or nearly constant temperature conditions, as outlined above, a shift of a beam in the x-y plane due to temperature variations of the temperature of the one more optical elements may be minimized or even avoided. Precision of calibrating the one or more optical elements may hereby be further improved.

In some examples of the calibration method, the test sample is formed on a substrate which is preferably lowerable during the forming of the test sample. Providing a substrate which is lowerable during the forming of the test sample is hereby particularly advantageous since, as outlined above, the different layers of the material may be supplied on a same height level for preparing the test sample using the additive layer manufacturing technique.

In some examples of the calibration method, a substrate material of the substrate (i.e. substrate plate/carrier) on which the test sample is formed is identical with the material used to form the test sample. This may allow for establishing a connection between the formed test sample and the substrate. Mixing of different materials may otherwise potentially result in compounds or phases (for example intermetallic compounds or phases) which may be brittle or fragile.

In some examples of the calibration method, a third temperature of the substrate is maintained at a target temperature and/or within a target temperature range during one or both of (i) the forming of the test sample and (ii) the determining of the geometry of the test sample. This may be particularly advantageous since, once preparation of the test sample has been completed, determining the geometry of the test sample may be performed while the temperature of the substrate may be kept substantially constant (i.e. at the same temperature as during the forming of the test sample). Precision of calibrating the one or more optical elements may hereby be further improved, as shrinkage of the substrate, which may influence the geometry of the test sample during cool down, may be minimized or even avoided.

In some examples of the calibration method, a build height of the test sample is above a threshold height which is dependent on an amount of heat transferable, via the test sample, from an area of the material onto which the optical pattern is projected to an opposite side of the material (i.e. to the substrate). Providing a build height of the test sample which is above a threshold height may be advantageous as any heat induced via the one more optical elements (for example one or more lasers) may partially be released into the surrounding material (for example powder) and only a part of the induced heat may reach the substrate. This may in particular allow for ensuring maintaining the temperature of the substrate at the target temperature and/or the target temperature range, as outlined above.

In some examples, the calibration method further comprises taking an optical image of the test sample, and wherein said determining of the geometry of the test sample comprises analyzing the optical image. Precision of calibrating the one more optical elements may hereby be improved further. The optical image may take different forms and/or the image may be taken from different positions of a camera. The camera (or more cameras) may comprise a line scan camera, a standard camera, an on-axis (regarding the laser/optical beam path) camera, an off-axis camera (placed at a different location of, for example, a room), or a combination thereof.

In some examples, the calibration method further comprises: placing a real and/or virtual grid over the optical image and/or placing one or more reference marks on an enclosure, in particular a floor of the enclosure, in which the test sample is formed, and identifying, in the optical image, a location of the test sample relative to the grid and/or the one or more reference marks to determine the geometry of the test sample. In some examples, the location of the test sample comprises a plurality of locations of the test sample which are identified relative to the virtual grid and/or the one more reference marks in order to determine the geometry of the test sample, that is when the test sample comprises a pattern with multiple individual elements, such as, but not limited to a dot pattern.

In some examples, multiple images are taken, which may then be stitched together in order to determine the geometry of the test sample. In some examples, different angles and/or positions of a camera and/or a camera with an x-y guide may hereby be used in order to obtain multiple images.

In some examples, the one or more images are hereby taken upon the forming of the test sample having been completed. This may be particularly advantageous, as the substrate has not shrunk or not yet shrunk when the one or more images are taken, which would otherwise potentially have an impact on the geometry of the test sample, and hence the calibration process.

In some examples of the calibration method, the determining of the geometry of the test sample is performed using a coordinate-measuring machine.

We further describe an apparatus for producing a three-dimensional workpiece, the apparatus comprising: a substrate adapted to receive material useable for producing the three-dimensional workpiece; one or more optical elements adapted to project an optical pattern onto the material in order to prepare, from said material, solidified material layers using an additive layer manufacturing technique to form a test sample; and a calibration unit adapted to: determine a geometry of the test sample; compare the determined geometry with a nominal geometry to generate calibration data, wherein the nominal geometry is based on data used for defining the optical pattern; and calibrate the one or more optical elements using said calibration data.

As outlined above in relation to the calibration method, the apparatus may be configured to obtain and/or generate and/or define data for defining a nominal geometry for example of a test sample, wherein the one or more optical elements are adapted to project an optical pattern, based on the defined data, onto a material in order to prepare, from said material, solidified material layers using an additive layer manufacturing technique to form the test sample. Obtaining and/or generating and/or defining the data for defining the nominal geometry of the test sample may be performable using, for example, a processor and/or a memory (which may be coupled to the processor) and/or a receiver (which may be coupled to one or both of the processor and the memory) of the apparatus. Data for defining the nominal geometry may be generated externally to the apparatus and subsequently be received by the apparatus via the receiver. The data may therefore, in some examples, not be generated by the apparatus itself.

The apparatus for producing the three-dimensional workpiece is adapted to perform the calibration method according to any one of the examples as described throughout the present disclosure. Hence, any preferred example implementations of the calibration method are equally applicable to the apparatus for producing the three-dimensional workpiece.

In some examples, the apparatus further comprises a heating unit, in particular a heating frame, wherein the heating unit is thermally coupled to the substrate to heat the substrate to and/or maintain the substrate at a target temperature and/or a target temperature range. This may be particularly advantageous as the temperature of the substrate may be brought to or kept at the same temperature during the determination of the geometry of the test sample as during the process for preparing the test sample. This may improve precision when calibrating the one more optical elements.

In some examples, the apparatus further comprises one or more temperature sensors adapted to measure a temperature variation rate of a temperature of one or more of (i) the one or more optical elements, (ii) the substrate, and (iii) an enclosure of the apparatus in which the substrate is arranged; a controller for controlling the one or more optical elements, wherein the one or more temperature sensors are coupled to the controller; and wherein the controller is adapted to control the one or more optical elements to project the optical pattern onto the material in order to prepare a said material layer (in particular the uppermost layer) of the test sample only when the temperature variation rate is below a threshold rate. At constant temperature conditions or nearly constant temperature conditions, as outlined above, a positional shift of a beam in particular in the x-y plane due to temperature variations of the temperature of the one more optical elements and/or the substrate and/or the enclosure may be minimized or even avoided. Determining the geometry and/or comparing the determined geometry with the nominal geometry for the test sample to generate the calibration data may hence be more precise, so as to improve precision for calibrating the one or more optical elements using the calibration data.

We further describe a calibration method for calibrating one or more optical elements of an additive layer manufacturing apparatus useable for producing a three-dimensional workpiece, the method comprising: projecting, using the one or more optical elements, an optical pattern onto a material in order to prepare, from said material, solidified material layers using an additive layer manufacturing technique to form a test sample; determining a geometry of the test sample; comparing the determined geometry with a nominal geometry to generate calibration data; and calibrating the one or more optical elements using said calibration data. This calibration method may comprise any one or more of the example implementations of the calibration method as outlined throughout the present disclosure. In particular, in this calibration method, the nominal geometry may be based on data used for defining the optical pattern.

We further describe an apparatus for producing a three-dimensional workpiece, the apparatus comprising: a substrate adapted to receive material useable for producing the three-dimensional workpiece; one or more optical elements adapted to project an optical pattern onto the material in order to prepare, from said material, solidified material layers using an additive layer manufacturing technique to form a test sample; and a calibration unit adapted to: determine a geometry of the test sample; compare the determined geometry with a nominal geometry to generate calibration data; and calibrate the one or more optical elements using said calibration data. This apparatus may comprise any one or more of the example implementations of the apparatus as outlined throughout the present disclosure. In particular, in this apparatus, the nominal geometry may be based on data used for defining the optical pattern.

In some examples, the apparatus is configured to receive (wirelessly or through a wired connection) data relating to the first temperature variation rate of the first temperature of a said optical element and/or the second temperature variation rate of the second temperature of the enclosure in which the material layer is prepared and/or the third temperature variation rate of the third temperature of the substrate, so that the apparatus is configured to prepare a said material layer of the test sample only when a said temperature variation rate is below the threshold rate using the received data. Additionally or alternatively, the apparatus is configured to process data, based for example on data obtained from monitoring and/or conducting the additive layer manufacturing process and/or data (for example based on previously determined data of a said temperature variation rate) stored in a data storage medium of the apparatus, to determine a said temperature variation rate, so that the apparatus is configured to prepare a said material layer of the test sample only when a said temperature variation rate is below the threshold rate based on a said determined temperature variation rate.

In various of the examples as described herein, once the one or more optical elements are calibrated, the (actual) three-dimensional workpiece may be prepared using the additive layer manufacturing technique.

These and other aspects of the invention will now be further described, by way of example only, with reference to the accompanying figures, wherein like reference numerals refer to like parts, and in which:

FIGS. 1 (a) to (e) show an exposure method according to the prior art;

FIG. 8 shows a schematic flow diagram of a method according to some example implementations as described herein.

Example methods and apparatus as described herein may be used for image field correction in particular of a powder bed.

In order to overcome the problems of the prior art as stated above, in some examples, a (dot) pattern is not exposed onto a foil or plate, but is exposed into the powder. This may eliminate all the disadvantages of the calibration method used in the prior art in which a foil or plate is used.

In order to implement examples of the calibration method as described herein, a coater may, in some examples, proceed always at the same level. With a suitable tool/measuring device, the coater may always be set at the same position and/or height. This may allow for preparing the test sample in the same plane as, for example, in the laser melting or laser sintering process performed subsequently in order to prepare a three-dimensional workpiece using calibrated optics.

It may be advantageous if preparing the test sample takes a longer time (for example longer than a predefined threshold), as the optics (for example scanners) may need a warm-up phase and it may take, in some example, several hours to reach a constant temperature. A delta T (i.e. temperature change) of the optics (for example scanner) may lead to a positional shift of the laser beam in the x-y direction.

Figure 1:
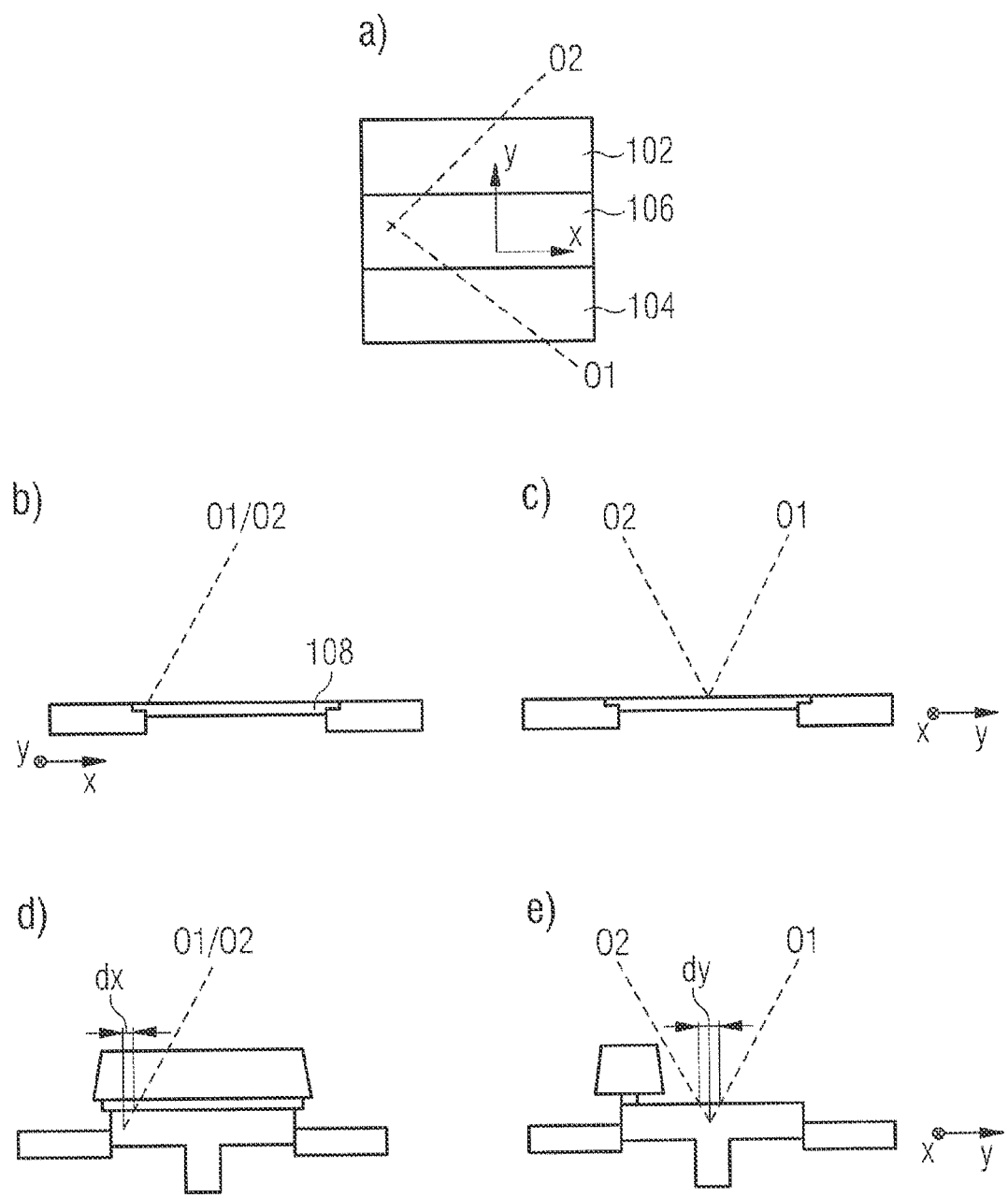
Figure 2:
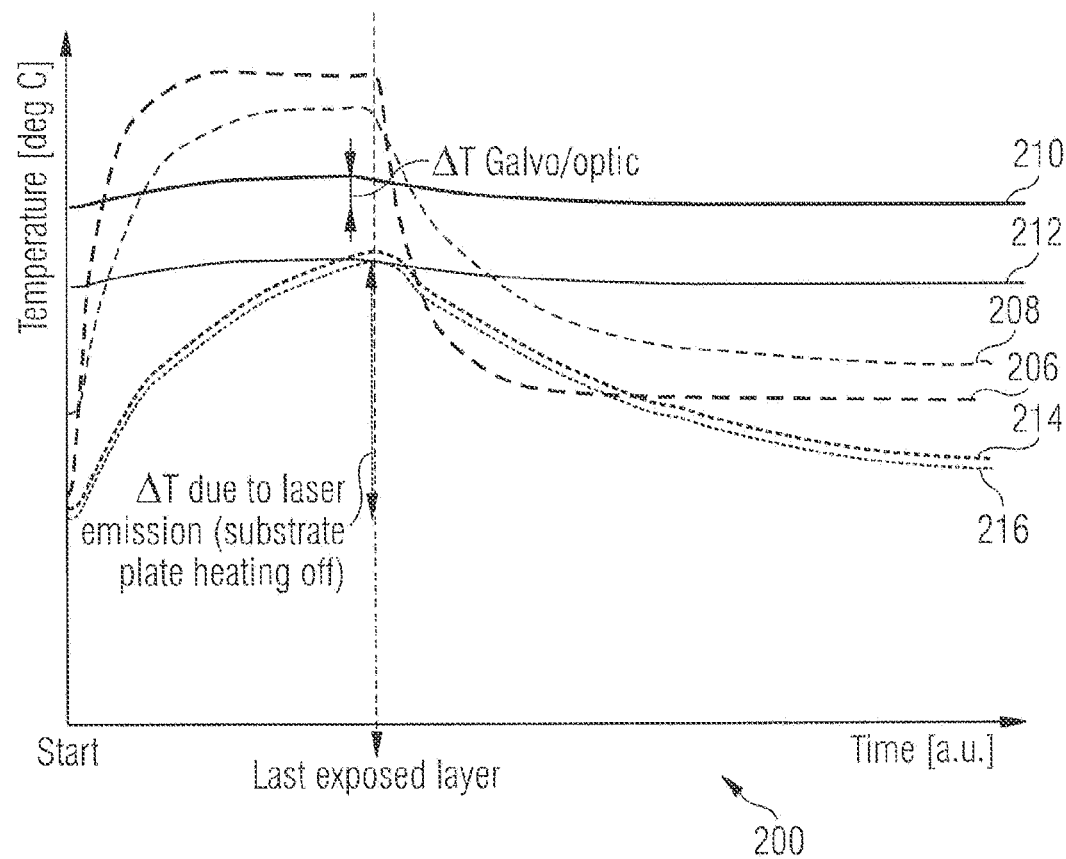
FIG. 2 shows temperature of components of an apparatus for producing a three-dimensional workpiece versus time.

FIG. 2 shows temperature (in degree Celsius) of components of an apparatus for producing a three-dimensional workpiece versus time (in arbitrary units).

In this example, a reference pattern (in this example a cylinder) was generated from each of a first optics/optical element and a second optics/optical element.

Measurements taken and shown in FIG. 2 relate to the temperature versus time for a flow sensor (206) of the apparatus, a process chamber (208) of the apparatus, a first galvanometer scanner (210) of the apparatus, a second galvanometer scanner (212) of the apparatus, a first (front) part of a substrate platform (214) of the apparatus, and a second (back) part of the substrate platform (216) of the apparatus.

It can be seen that in the last exposed layer of the test sample, the temperatures of the galvanometer scanners and of the process chamber have settled to a constant temperature.

The platform heating was turned off, such that the increase in temperature of the substrate platform originated from the energy stemming from the laser emission.

Another point which may need to be kept in mind is the temperature of the substrate plate on which the test sample is built. The material of the substrate plate corresponds, in some examples, to the powder that is melted or sintered. A connection between the generated test sample and the substrate plate may hereby be achieved.

Different materials may have different coefficients of linear expansion a, as shown in the following table for some examples.

TABLE 1 coefficients of linear expansion $\alpha$ for different materials.

| | $\alpha_{0 \ldots 100°\ C.}$ | $\alpha_{0 \ldots 500°\ C.}$ |
|---|---|---|
| Aluminum | $23.8 \times 10^{-6}\ K^{-1}$ | $27.4 \times 10^{-6}\ K^{-1}$ |
| Steel C 60 | $11.1 \times 10^{-6}\ K^{-1}$ | $13.9 \times 10^{-6}\ K^{-1}$ |
| Stainless steel | $16.4 \times 10^{-6}\ K^{-1}$ | $18.2 \times 10^{-6}\ K^{-1}$ |
| Invar(RTM) steel | $0.9 \times 10^{-6}\ K^{-1}$ | $1.2 \times 10^{-6}\ K^{-1}$ |

If the substrate plate is heated to, for example, 100° C. (preheating temperature for steel) during the calibration process/preparation of the test sample, it expands according to the coefficient $\alpha$. The heating may deliberately be provided through a heater, but additionally or alternatively the laser(s) also introduce heat into the substrate plate. If the test sample is evaluated after completion at, for example, room temperature under, for example, a coordinate-measuring machine, the substrate plate shrinks together with the generated test sample. Even for a substrate plate (side length of, for example, 600 mm) made of Invar®, the shrinkage would be 600 mm×$0.9 \times 10^{-6}\ K^{-1}$×(100 K−20 K)=0.0432 mm.

To eliminate this problem, a high (higher than a predefined threshold) test sample may be advantageous. Heat induced by the beam (for example laser beam) may be partly released into the surrounding powder and only a part may reach the substrate plate. At the same time, the substrate plate may be kept at a certain temperature with a heating unit and corresponding control.

When evaluating the test sample, the substrate plate may be brought to the same temperature (ideally the same temperature as in the test sample preparation process). This can be done using, for example, a specially designed frame for the coordinate-measuring machine with integrated heating. In addition, the substrate plate may be centered both in the apparatus (for example selective laser melting machine) and in the frame. Alternatively or additionally, a software-based simulation/correction of the shrunken substrate plate (for example when assuming a central positioning of the substrate plate in the apparatus) may be used when evaluating the test sample.

Figure 3:
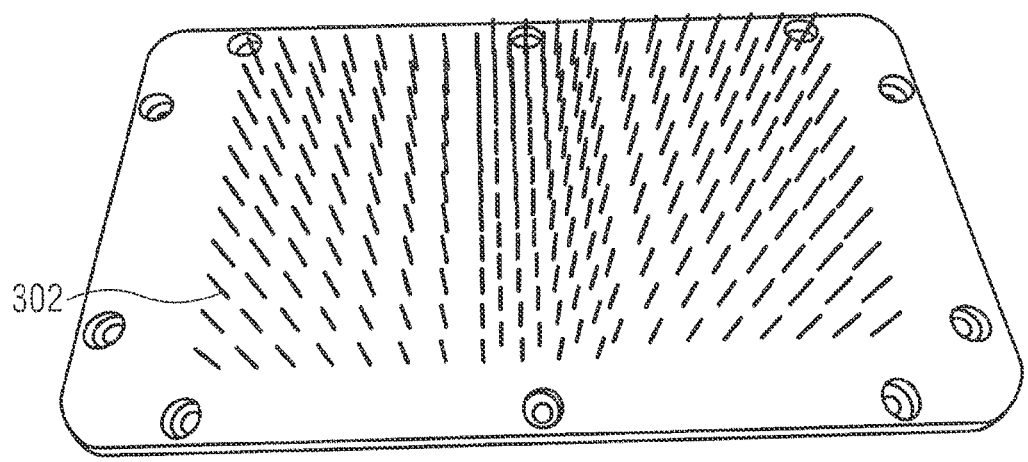
FIG. 3 shows an image of a test sample according to some example implementations as described herein.

FIG. 3 shows an image of a test sample according to some example implementations as described herein.

The test sample comprises, in this example, a pattern of individual elements 302 with a build height above a predefined threshold.

Figure 4:
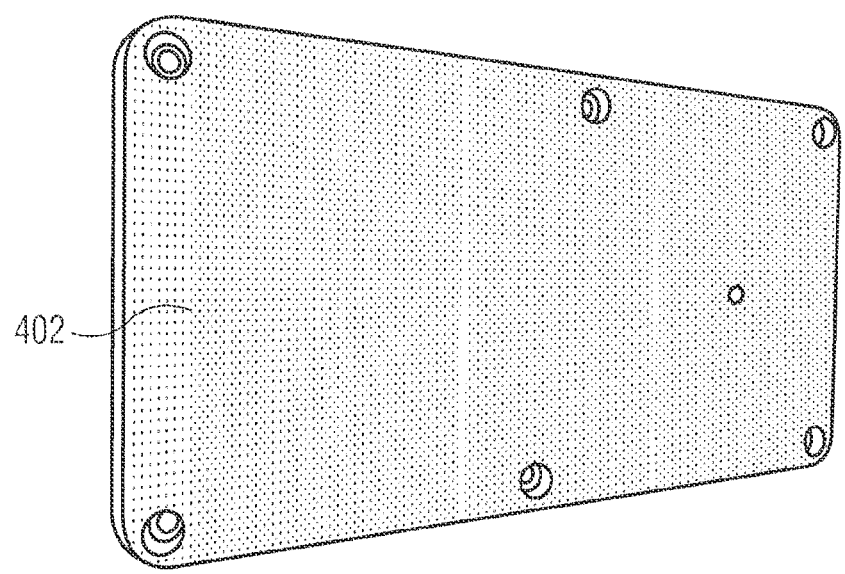
FIG. 4 shows an image for an image field correction according to some example implementations as described herein.

FIG. 4 shows an image for an image field correction according to some example implementations as described herein. The image field correction is applied on the substrate plate over multiple layers 402.

In this example, using a coordinate-measuring machine, the last exposed layer of the reference pattern is then measured and a correction file for each optic is created from it, in some examples based on a difference between nominal and actual coordinates. This correction is, in this example, performed based on the apparatus having been under process conditions during the test sample preparation and calibration process.

In some examples, an additional or alternative evaluation may be carried out in the apparatus by a camera. The camera may take a picture or, when using several optics, several cameras may each take a picture. These pictures may then be stitched together.

After the (high, i.e. above a threshold height) test sample preparation, one or more images are taken, whereby the two cameras may, in some examples, be misaligned with each other. The images may be taken from varying angles and/or positions of a camera and/or a camera with an x-y guide may be used in order to obtain multiple images. A virtual and/or real grid may be placed over the one or more images.

Figure 5:
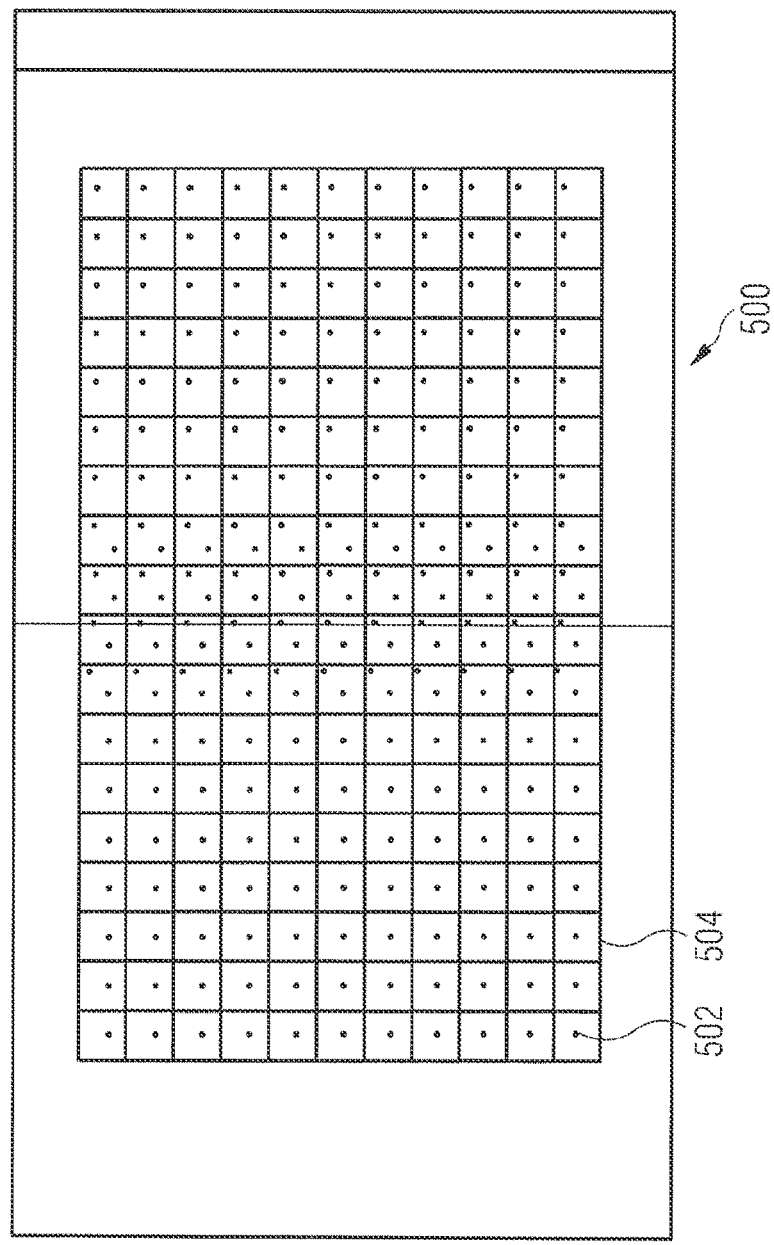
FIG. 5 shows an image of a test sample and a virtual grid according to some example implementations as described herein.

FIG. 5 shows an image 500 of a test sample and a virtual grid as mentioned above. In this example, the test sample comprises a pattern of multiple elements (for example pins) 502, and a virtual grid 504 is placed over this pattern.

Additionally or alternatively to using a virtual grid, reference marks for the cameras in the enclosure/on the process chamber floor may be used. Additionally or alternatively, an optical pattern (using, for example, one or more LEDs and/or one or more lasers) may be projected onto the test sample. The optical pattern may, for example, comprise one or more of a transparent (for example glass) plate comprising a reference pattern, a transparent foil comprising a reference pattern, one or more diffractive optical elements (for example one or more DOE laser modules), and one or more pattern projectors (for example one or more LED pattern projectors).

The transparent (for example glass) plate and/or foil may be placed on the material layer (e.g. powder bed) after completion of calibration. The plate and/or foil may be positioned using pins (for example dowel pins).

When using one or more diffractive optical elements (for example one or more DOE laser modules) and/or one or more pattern projectors (for example one or more LED pattern projectors), these may be arranged within and/or outside of the process chamber and may project the grid onto the material layer (e.g. powder bed).

Afterwards, when the transparent (for example glass) plate comprising a reference pattern and/or the transparent foil comprising a reference pattern and/or the one or more diffractive optical elements (for example one or more DOE laser modules) and/or the one or more pattern projectors (for example one or more LED pattern projectors) are positioned, the one or more images may be taken.

Figure 6:
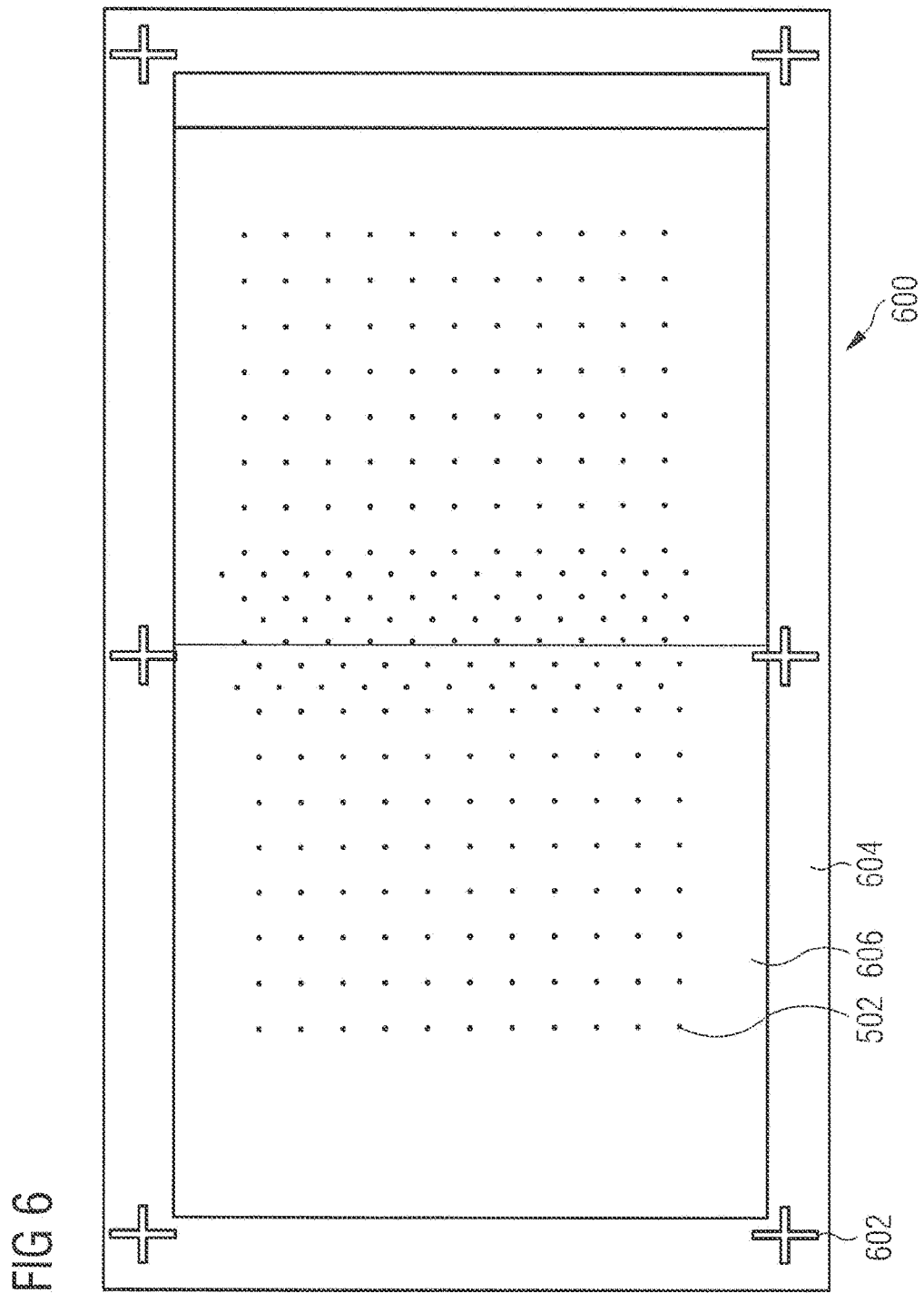
FIG. 6 shows an image of a test sample and reference marks according to some example implementations as described herein.

FIG. 6 shows an image 600 of a test sample and such reference marks 602 arranged on the process chamber floor 604 (in this example in the form of reference marks which are actually projected onto the chamber floor) on which the substrate 606 is arranged.

The location of the elements of the test sample may then be identified relative to the virtual grid and/or the one more reference marks in order to determine the geometry of the test sample.

This evaluation method prevents the substrate plate from shrinking as the temperature may not drop.

Examples of the evaluation and correction method using one or more optical images may be combined with examples of the calibration method as outlined above using a coordinate-measuring machine.

Figure 7:
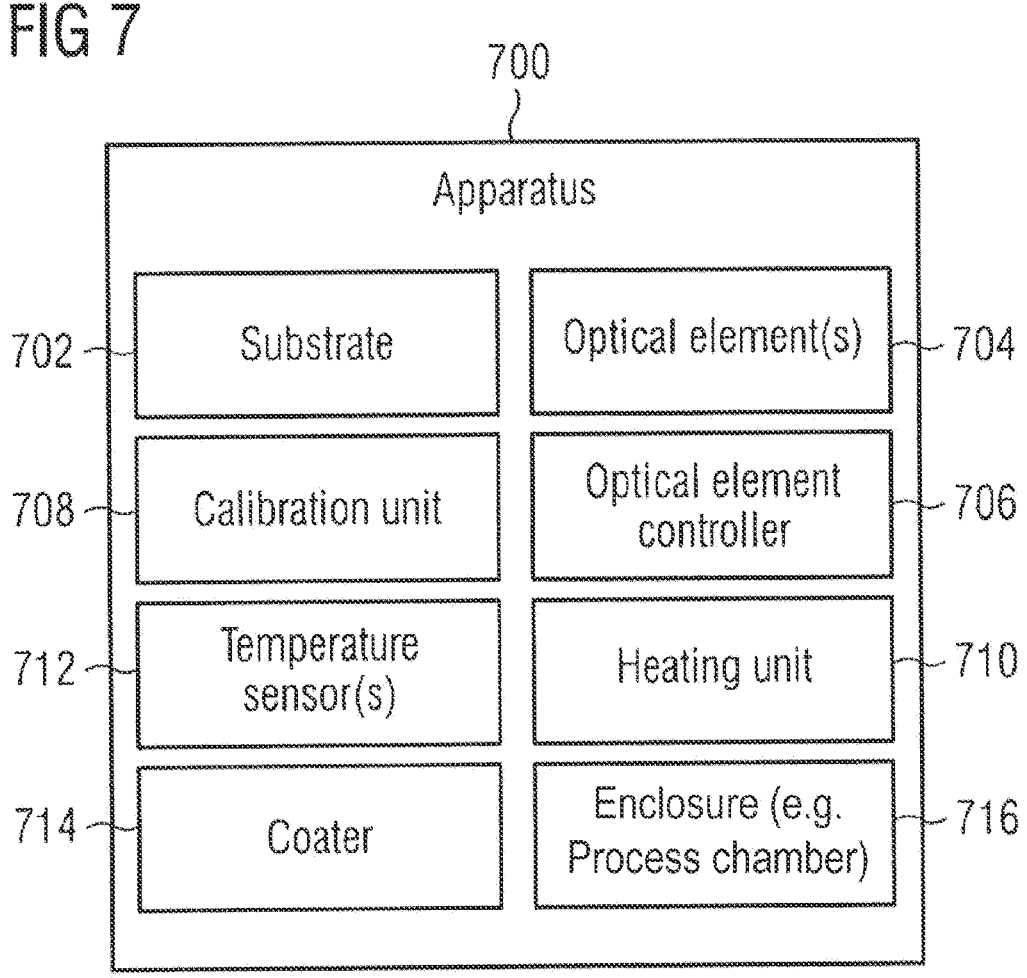
FIG. 7 shows a schematic block diagram of an apparatus according to some example implementations as described herein.

FIG. 7 shows a block diagram of an apparatus 700 according to some example implementations as described herein.

In this example, the apparatus comprises a substrate 702, one or more optical elements 704 (such as, but not limited to one or more beam sources, such as laser sources, and/or one or more beam steering elements and/or beam splitting elements), an optical element controller 706 for controlling the one or more optical elements 704, a calibration unit 708 (comprising, in some examples, a coordinate-measuring machine) used to calibrate, via the optical element controller 706, the one or more optical elements 704, a heating unit 710 adapted to heat the substrate 702 (and/or keep the substrate 702 at a target temperature or target temperature range), one or more temperature sensors 712 adapted to measure a temperature of one or more of the substrate 702, the one or more optical elements 704 and a process chamber 716 of the apparatus, and a coater 714 for coating material layers on the substrate 702.

The optical element controller 706 and the calibration unit 708 may be integral to a single unit.

The temperature sensors 712 are, in some examples, coupled to the optical element controller 706 and a controller for the heating unit 710.

FIG. 8 shows a schematic flow diagram of a method 800 according to some example implementations as described herein.

The method comprises the following steps. At step S802, using one or more optical elements, an optical pattern is projected onto a material in order to prepare, from said material, solidified material layers using an additive layer manufacturing technique to form a test sample. At step S804, a geometry of the test sample is determined. At step S806, the determined geometry is compared with a nominal geometry to generate calibration data, wherein the nominal geometry is based on data used for defining the optical pattern. At step S808, the one or more optical elements are calibrated using said calibration data.

No doubt many other effective alternatives will occur to the skilled person. It will be understood that the invention is not limited to the described embodiments and example implementations and encompasses modifications apparent to those skilled in the art and lying within the scope of the claims appended hereto.

The invention claimed is:

1. A calibration method for calibrating one or more optical elements of an additive layer manufacturing apparatus useable for producing a three-dimensional workpiece, the method comprising:
   projecting, using the one or more optical elements, an optical pattern onto a material in order to prepare, from said material, solidified material layers using an additive layer manufacturing technique to form a test sample;
   determining a geometry of the test sample;
   comparing the determined geometry with a nominal geometry to generate calibration data; and
   calibrating the one or more optical elements using said calibration data,
   wherein one or more of the material layers of the test sample are prepared only when a first temperature variation rate of a first temperature of a said optical element and/or a second temperature variation rate of a second temperature of an enclosure in which the one or more material layers are prepared and/or a third temperature variation rate of a third temperature of a substrate on which the test sample is formed is below a threshold rate.

2. A calibration method as claimed in claim 1, wherein the geometry and the nominal geometry comprise coordinates and nominal coordinates, respectively, of a location of the test sample.

3. A calibration method as claimed in claim 1, wherein said determining comprises determining geometrical data relating to a said material layer of the test sample prepared last using the additive layer manufacturing technique.

4. A calibration method as claimed in claim 1, wherein said preparing using the additive layer manufacturing technique comprises supplying different layers of said material on a same height level for preparing the test sample using the additive layer manufacturing technique.

5. A calibration method as claimed in claim 4, wherein said supplying of the different layers of said material on the same height level comprises lowering the test sample prior to supplying consecutive ones of the different layers.

6. A calibration method as claimed in claim 1, wherein said forming of the test sample is performed over a period longer than a threshold period.

7. A calibration method as claimed in claim 1, wherein the nominal geometry is based on data used for defining the optical pattern.

8. A calibration method as claimed in claim 1, wherein the substrate is lowerable during the forming of the test sample.

9. A calibration method as claimed in claim 1, wherein a substrate material of the substrate on which the test sample is formed is identical with the material used to form the test sample.

10. A calibration method as claimed in claim 1, wherein the third temperature of the substrate is maintained at a target temperature and/or within a target temperature range during one or both of (i) the forming of the test sample and (ii) the determining of the geometry of the test sample.

11. A calibration method as claimed in claim 1, wherein a build height of the test sample is above a threshold height which is dependent on an amount of heat transferable, via the test sample, from an area of the material onto which the optical pattern is projected to an opposite side of the material.

12. A calibration method as claimed in claim 1, further comprising taking an optical image of the test sample, and wherein said determining of the geometry of the test sample comprises analyzing the optical image.

13. A calibration method as claimed in claim 12, further comprising:
placing a real and/or virtual grid over the optical image and/or placing one or more reference marks on a floor of an enclosure, in which the test sample is formed, and
identifying, in the optical image, a location of the test sample relative to the grid and/or the one or more reference marks to determine the geometry of the test sample; and/or
wherein the optical image is taken upon the forming of the test sample having been completed.

14. A calibration method as claimed in claim 1, wherein the determining of the geometry of the test sample is performed using a coordinate-measuring machine.

15. An apparatus for producing a three-dimensional workpiece, the apparatus comprising:
a substrate adapted to receive material useable for producing the three-dimensional workpiece;
one or more optical elements adapted to project an optical pattern onto the material in order to prepare, from said material, solidified material layers using an additive layer manufacturing technique to form a test sample; and
a calibration unit adapted to:
determine a geometry of the test sample;
compare the determined geometry with a nominal geometry to generate calibration data; and
calibrate the one or more optical elements using said calibration data,
wherein the apparatus is configured to prepare one or more of the material layers of the test sample only when a first temperature variation rate of a first temperature of a said optical element and/or a second temperature variation rate of a second temperature of an enclosure in which the one or more material layers are prepared and/or a third temperature variation rate of a third temperature of the substrate is below a threshold rate.

16. An apparatus as claimed in claim 15, further comprising a heating unit comprising a heating frame, wherein the heating unit is thermally coupled to the substrate to heat the substrate to and/or maintain the substrate at a target temperature and/or a target temperature range.

17. An apparatus as claimed in claim 15, further comprising:
one or more temperature sensors adapted to measure the temperature variation rate of the temperature of one or more of (i) the one or more optical elements, (ii) the substrate, and (iii) the enclosure of the apparatus in which the substrate is arranged;
a controller for controlling the one or more optical elements, wherein the one or more temperature sensors are coupled to the controller; and
wherein the controller is adapted to control the one or more optical elements to project the optical pattern onto the material in order to prepare the one or more material layers of the test sample only when the first temperature variation rate and/or the second temperature variation rate and/or the third temperature variation rate is below the threshold rate.

18. An apparatus as claimed in claim 15, wherein the nominal geometry is based on data used for defining the optical pattern.

19. A calibration method for calibrating one or more optical elements of an additive layer manufacturing apparatus useable for producing a three-dimensional workpiece, the method comprising:
projecting, using the one or more optical elements, an optical pattern onto a material in order to prepare, from said material, solidified material layers using an additive layer manufacturing technique to form a test sample;
determining a geometry of the test sample;
comparing the determined geometry with a nominal geometry to generate calibration data; and
calibrating the one or more optical elements using said calibration data,
wherein said preparing using the additive layer manufacturing technique comprises supplying different layers of said material on a same height level for preparing the test sample using the additive layer manufacturing technique.

20. A calibration method for calibrating one or more optical elements of an additive layer manufacturing apparatus useable for producing a three-dimensional workpiece, the method comprising:
projecting, using the one or more optical elements, an optical pattern onto a material in order to prepare, from said material, solidified material layers using an additive layer manufacturing technique to form a test sample;

determining a geometry of the test sample;

comparing the determined geometry with a nominal geometry to generate calibration data; and calibrating the one or more optical elements using said calibration data, wherein a build height of the test sample is above a threshold height which is dependent on an amount of heat transferable, via the test sample, from an area of the material onto which the optical pattern is projected to an opposite side of the material.

21. A calibration method for calibrating one or more optical elements of an additive layer manufacturing apparatus useable for producing a three-dimensional workpiece, the method comprising:

projecting, using the one or more optical elements, an optical pattern onto a material in order to prepare, from said material, solidified material layers using an additive layer manufacturing technique to form a test sample;

determining a geometry of the test sample;

comparing the determined geometry with a nominal geometry to generate calibration data;

calibrating the one or more optical elements using said calibration data;

taking an optical image of the test sample, and wherein said determining of the geometry of the test sample comprises analyzing the optical image;

placing a real and/or virtual grid over the optical image and/or placing one or more reference marks on a floor of an enclosure, in which the test sample is formed, and identifying, in the optical image, a location of the test sample relative to the grid and/or the one or more reference marks to determine the geometry of the test sample; and/or wherein the optical image is taken upon the forming of the test sample having been completed.

* * * * *